(12) United States Patent
Pasternak

(10) Patent No.: US 9,817,910 B2
(45) Date of Patent: Nov. 14, 2017

(54) RESTFUL SERVICE DESCRIPTION LANGUAGE

(71) Applicant: Red Hat Israel, Ltd., Raanana (IL)

(72) Inventor: Michael Pasternak, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 469 days.

(21) Appl. No.: 13/656,032

(22) Filed: Oct. 19, 2012

(65) Prior Publication Data

US 2014/0115017 A1   Apr. 24, 2014

(51) Int. Cl.
*G06F 17/30* (2006.01)

(52) U.S. Cl.
CPC ............... *G06F 17/3089* (2013.01)

(58) Field of Classification Search
CPC ......... G06F 17/30893; G06F 17/30923; G06F 17/3089; G06F 17/30887
See application file for complete search history.

(56) References Cited

U.S. PATENT DOCUMENTS

| | | | |
|---|---|---|---|
| 9,231,819 B2 * | 1/2016 | Pasternak | H04L 29/08099 |
| 9,372,681 B1 * | 6/2016 | Shevchenko | G06F 8/61 |
| 9,697,297 B2 * | 7/2017 | James | G06F 17/30887 |
| 2004/0216127 A1 * | 10/2004 | Datta et al. | 719/313 |
| 2005/0027701 A1 * | 2/2005 | Zane | G06F 8/30 |
| 2008/0016151 A1 * | 1/2008 | Howard | G06F 17/3089 709/203 |
| 2009/0281996 A1 * | 11/2009 | Liu et al. | 707/3 |
| 2011/0099467 A1 * | 4/2011 | Kapur et al. | 715/236 |
| 2011/0238688 A1 * | 9/2011 | Mercuri | G06Q 30/02 707/769 |
| 2012/0011167 A1 * | 1/2012 | Schmidt | G06F 17/3087 707/802 |
| 2012/0079066 A1 * | 3/2012 | Li | H04L 67/26 709/217 |
| 2013/0160130 A1 * | 6/2013 | Mendelev | G06F 21/56 726/25 |
| 2014/0033170 A1 * | 1/2014 | Nimashakavi | G06F 17/30893 717/120 |
| 2014/0115017 A1 * | 4/2014 | Pasternak | G06F 17/3089 707/827 |
| 2014/0157227 A1 * | 6/2014 | Pasternak | G06F 8/30 717/106 |

* cited by examiner

*Primary Examiner* — Noosha Arjomandi
(74) *Attorney, Agent, or Firm* — Lowenstein Sandler LLP

(57) ABSTRACT

A processing device identifies uniform resource identifiers (URIs) for a RESTful (Representational State Transfer) web service in a server and creates server-side metadata describing each of the URIs without nesting metadata of one of the URIs in metadata of another one of the URIs. The processing device creates a file that includes the URIs and the corresponding server-side metadata for the corresponding URI to describe the RESTful web service.

19 Claims, 9 Drawing Sheets

RESTFUL SERVICE DESCRIPTION LANGUAGE

TECHNICAL FIELD

The present disclosure relates to service description language, and more particularly, to RESTful service description language.

BACKGROUND

Web services are client and server applications that communicate over the World Wide Web's (WWW) Hypertext Transfer Protocol (HTTP). A web service is a software component provided through a network-accessible endpoint and can be called from other applications. For example, a financial company may have a web service that provides up to the minute stock quotes for customers who do their trading with that financial company. The information provided by the web service can be read from a web page and displayed, or read from a stand-alone application on a customer's desktop computer.

REpresentational State Transfer (REST) is a style of software architecture for distributed systems such as the World Wide Web. REST-style architectures include clients and servers. Clients can initiate requests to the servers, which can process the requests and return appropriate responses. In REST, requests and responses are built around the transfer of representations of resources. A representation of a resource is typically a document that captures the current or intended state of the resource. For example, the resource may be stock quotes.

A RESTful web service is a web service that is implemented using HTTP and the principals of REST. For example, a RESTful web service may be a customer data management web service and may have three resources: (1) a resource that is a list of all customers, (2) a resource that is data for a specific customer, and (3) a resource for adding a customer to the customer data. The RESTful resources can each have a uniform resource identifier (URI), which client applications can use to consume the resource.

A software developer may wish to build a client application to consume the resources provided by a RESTful web service. Typically, the software developer has to have the documentation for the RESTful web service and the documentation for the server hosting the RESTful web service. The software developer usually has to manually sort through the documentation to obtain the appropriate information for creating code for the client application.

In some conventional solutions, a software developer may use a Web Application Description Language (WADL) that describes the RESTful web service to create a client application. The WADL is formatted to describe the resources of the RESTful web service. Traditionally, WADL includes a listing of resources with descriptions of the resources. The resource descriptions are usually nested within each other. Typically, a software developer would manually and recursively drill down through the nested resource descriptions to search for and collect some portion of information for creating the client application code. Generally, software developers must traverse through the nested resource descriptions to gather the appropriate information and combine the information to identify the URI for the resource. In WADL, all types of parameters are mixed in the resource descriptions, which can make it difficult for software developers to distinguish which parameters may be relevant to a client application that is being coded. The conventional solutions (e.g., documentation and WADL) for describing a RESTful web service can result in time-consuming processes for coding client applications to interface with the RESTful web service.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
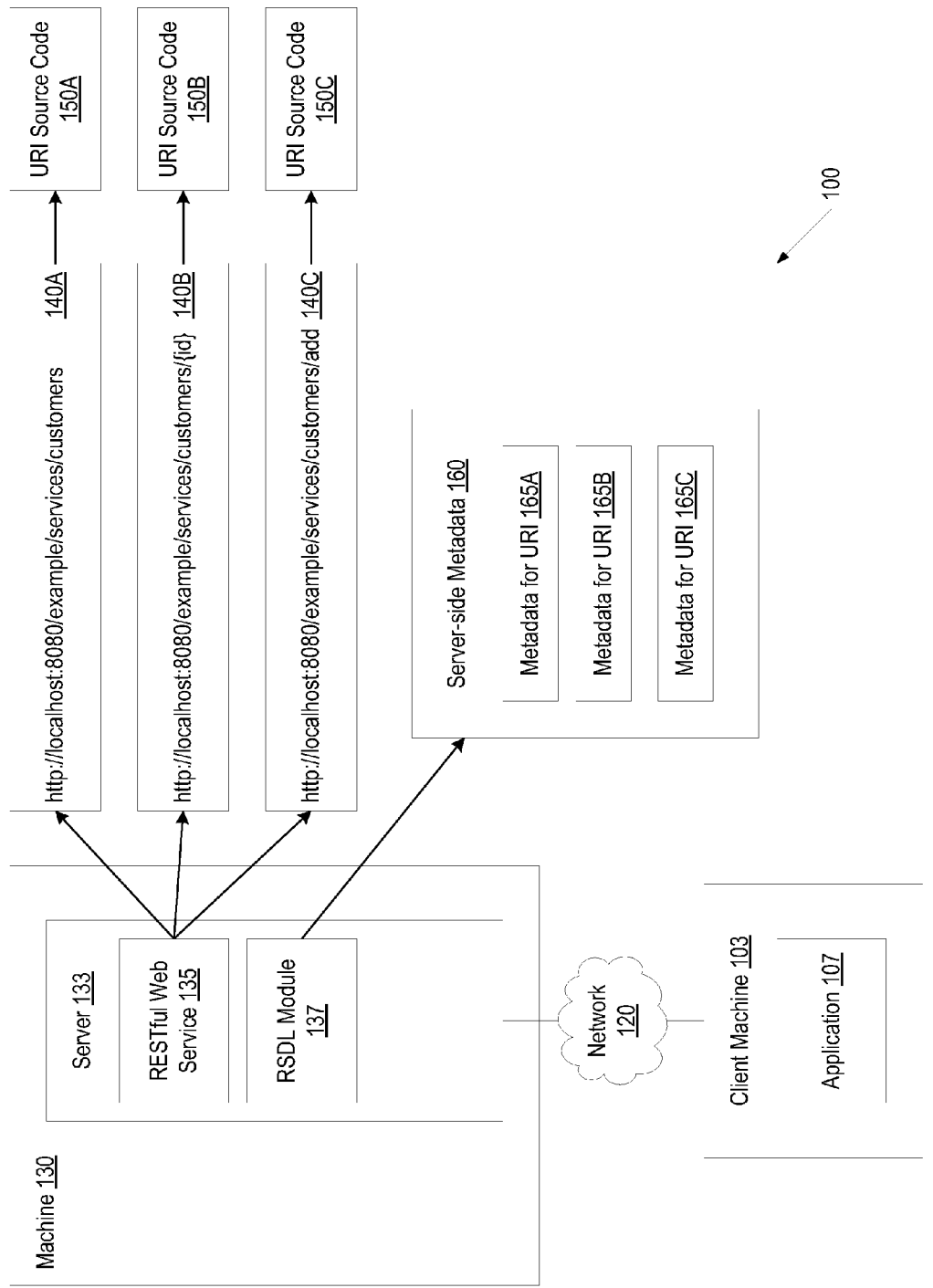
FIG. 1 illustrates an example system architecture, in accordance with various implementations.

Described herein are a method and apparatus for describing uniform resource identifiers (URIs) of a RESTful web service using a RESTful service description language (RSDL), according to various implementations. A RESTful web service is a web service that is implemented using HTTP (hypertext transfer protocol) and the principals of REST. A RESTful web service may include a URI for each resource. For example, there may be a virtual infrastructure management RESTful web service for managing virtual machines. The RESTful web service may have resources to get data for a particular virtual machine (VM) identifier (ID), delete a particular VM identifier, get the status of a particular VM identifier, etc. For example, the URI "http://localhost:8080/example/services/api/vms/12345" may be for getting the data for the virtual machine identifier 12345.

Implementations can generically describe the URIs for a RESTful web service and can store the descriptions as server-side metadata using RSDL. The RSDL server-side metadata for the RESTful web service can be stored, for example, in a RSDL file for the RESTful web service. A RSDL file can provide a machine-readable description of how the URIs of the RESTful web service can be called, what parameters should be passed, what data structures to return, etc.

According to various implementations, the RSDL is formatted to describe the URIs of the resources of a RESTful web service, rather than being formatted to describe the resources themselves. URIs are hereinafter also referred to as links or a link. For example, the RSDL for a RESTful web service may include a list of the URIs and metadata for each URI. The generic RSDL descriptions of the URIs in the server-side metadata can be XML (Extensible Markup Language)-based and can be used for automatically creating RESTful web service clients, without having a user to manually traverse through various nested descriptions of resources or search through the documentation for the RESTful web service. The generic descriptions are not specific to any particular programming language can be used to generate client applications to consume the RESTful web service in a variety of different programming languages. For example, the RSDL for a RESTful web service can be used to create a web service client in Java, Python, etc.

Various implementations also support method overloads for a RESTful web service. A procedural programming language (e.g., Java, C++, C#, D, Ada) can include a method overload. A method overload is several methods having the same name and each method accepts a different set of parameters. One implementation of RSDL describing URIs pertaining to a method overload is described in greater detail below in conjunction with FIG. 8.

Various implementations also allow a browser application to quickly identify a URI for a resource and to automatically retrieve all of the methods, actions, sub-resources, etc. that may be available for the corresponding resource without having a user to manually sort through documentation for the RESTful web service or without the user having to determine relationships between nested descriptions of resources. For example, a virtual infrastructure management RESTful web service may include URIs for resources that are available for particular virtual machines. For example, there may be resources to get data for a particular virtual machine (VM) identifier, delete a particular VM identifier, get the status of a particular VM identifier, etc. A browser application may receive user input '/api/vms/12345,' where '12345' is the VM identifier. Using the RSDL for the RESTful web service, the browser application can use the user input to automatically retrieve all of the methods, operations (e.g., get, delete, add, etc.), sub-resources, etc. that are available for the corresponding resource by retrieving all descriptions in the RSDL for links, for example, that have 'href="/api/vms/{vm:id}"'.

Various implementations describe a server computer system identifying one or more RESTful (Representational State Transfer) web service uniform resource identifiers (URIs) that correspond to a RESTful web service. The URIs may be stored within the server or in a different server. The server computer system creates server-side metadata for each of the RESTful web service URIs and creates a file that includes the RESTful web service URIs and the corresponding server-side metadata for the corresponding RESTful web service URI to describe the RESTful web service. The RSDL can use HTTP attributes to describe the URIs, as discussed in greater detail below.

FIG. 1 is an example system architecture 100 for various implementations. The system architecture 100 can include one or more machines 130 coupled to one or more client machines 103 via a network 120. The network 120 may be a public network, a private network, or a combination thereof. The machines 130 can include, and are not limited to, any data processing device, such as a desktop computer, a laptop computer, a mainframe computer, a personal digital assistant, a server computer, a handheld device or any other device configured to process data.

A machine 130 can include a network-accessible server-based functionality (e.g., server 133) or other data processing equipment. The server 133 can include one or more RESTful web services 135. REpresentational State Transfer (REST) is an architecture style for accessing information on the web. In REST, information on the server-side is considered a resource, which developers can access in a uniform way using URIs and HTTP.

An entity can create a RESTful web service 135. An entity, as referred to herein, can represent any person, a business organization such as a corporation, an educational institution such as a college and university, etc. The RESTful web service 135 can have one or more resources, which can be accessed, for example by an application 107 hosted on a client machine 103. For example, an entity may create a RESTful web service 135 for the entity's customer data. The RESTful web service 135 may have a resource that is a list of all of the entity's customers, a resource that is data for a specific customer, a resource for adding a customer to the customer data, etc. The client machine 103 may be a computing device such as a server computer, a desktop computer, a set-top box, a gaming console, a television, a portable computing device such as, and not limited to, mobile telephones, personal digital assistants (PDAs), portable media players, netbooks, laptop computers, and the like.

The RESTful web service 135 can have URIs 140A-C that correspond to the resources of the RESTful web service 135. For example, URI 140A can be for the list of all of the entity's customers, URI 140B can be for data for a specific customer identifier (ID), and URI 140C can be used to add a customer. An application 107 can use the URI 140A-C to consume the resources. The client machines 103 can host one or more applications 107. An application 107 can be any type of application including, for example, a web application, a desktop application, a browser application, etc.

The server 133 can include a RESTful service description language (RSDL) module 137 to describe the URIs (e.g., URIs 140A-C) for the RESTful web services 135 in a generic format. A generic format is a format that can be used by a number of different programming languages. The RSDL module 137 can publish a description of the URIs 140A-C as server-side metadata 160. The server-side metadata 160 can expose the structure of the URIs 140A-C for the RESTful web service 135 and can include metadata 165A-C for the corresponding URIs 140A-C. The server-side metadata 160 can be a RSDL file that describes the URIs 140A-B. The server-side metadata 160 can be an XML-formatted document that includes information about each URI 140A-C for the RESTful web service, including, for example, and not limited to, operations (e.g., add, delete, get, etc.) that can be called on the RESTful web service 135, input parameters that can be passed for the operations, return values from an operation, etc. In one implementation, the RSDL module 137 uses the source code 150A-C for the URIs 140A-C for the RESTful web service 135 to create the server-side metadata 160. The URI source code 150A-C can be stored in the server 133. In another implementation, the RSDL module 137 receives user input to create the server-side metadata 160 for the URIs 140A-C. The server-side metadata 160 can be stored in a data store that is coupled to the server 133.

Figure 2:
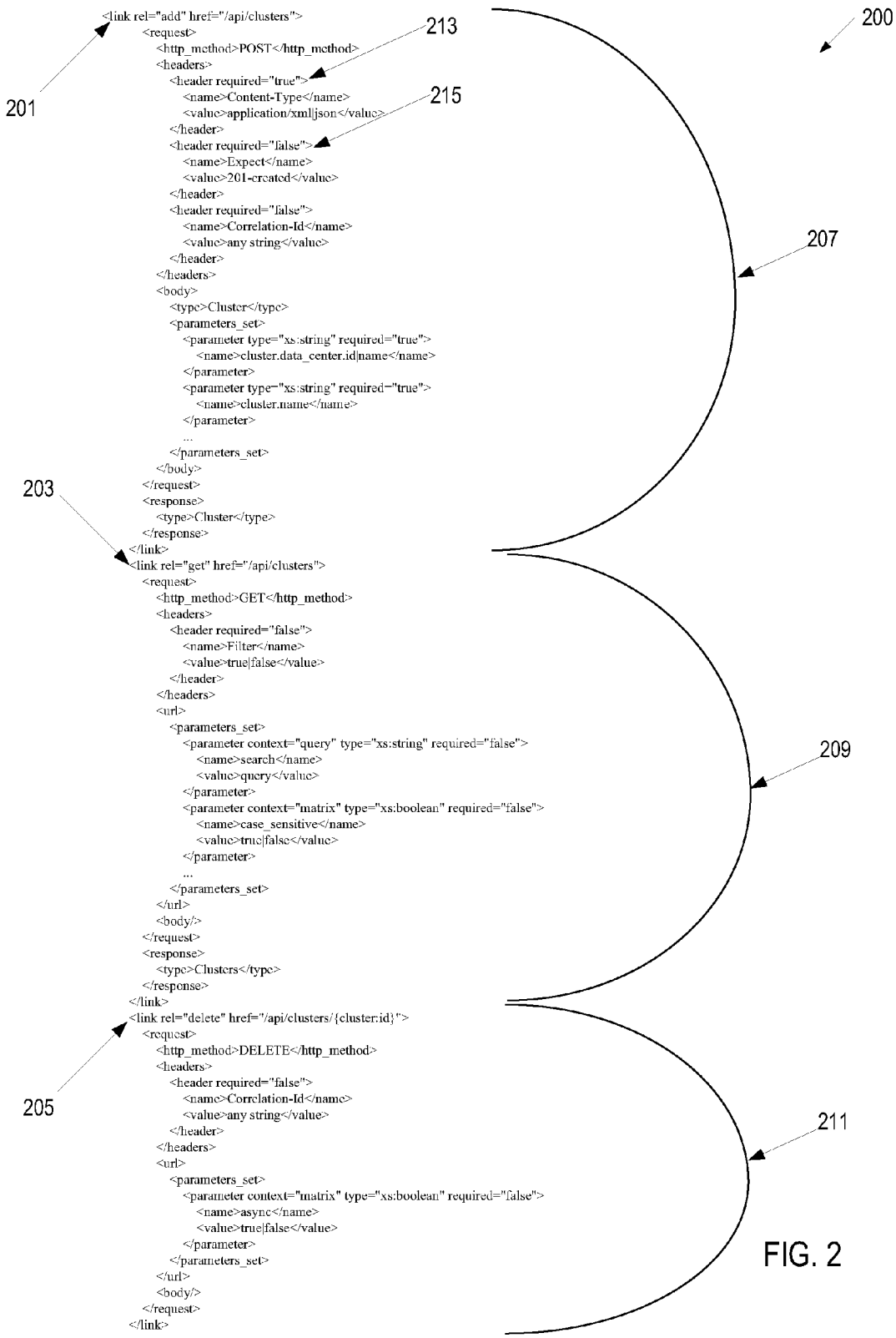
FIG. 2 illustrates an example of server-side metadata describing uniform resource identifiers (URIs) of a RESTful web service, in accordance with various implementations.

FIG. 2 illustrates an example of a portion of server-side metadata 200 describing URIs of a RESTful web service, in accordance with various implementations. For example, the RESTful web service may be a virtual infrastructure management RESTful web service. The RESTful web service may include URIs for resources, such as, adding a cluster to the infrastructure, providing a list of the clusters in the infrastructure, and deleting a cluster from the infrastructure.

an optional argument, a mandatory argument, The server-side metadata 200 can include descriptions for the three URIs. The format of the server-side metadata 200 can include a list of URIs and a description for each URI. For example, there is a URI description 201 for the URI of the resource that adds a cluster to the infrastructure, a URI description 203 for the URI of the resource that provides a list of the clusters in the infrastructure, and a URI description 205 for the URI of the resource that deletes a cluster from the infrastructure.

The URI descriptions 201,203,205 can use a HTTP relationship attribute and a HTTP hypertext reference attribute to describe the URIs. A HTTP relationship attribute can be used to describe the operation (e.g., add, get, update, delete, activate, deactivate, etc.) associated with the URI. An example of a HTTP relationship attribute can include, and is not limited to, HTTP 'rel'. A HTTP hypertext reference attribute can be used to specify the link that should be used for operating on the resource. Examples of a HTTP hypertext reference attribute can include, and are not limited to, href (hypertext reference), title, target, class, and id (identifier). For brevity and simplicity, 'href' is used as an example of a HTTP hypertext reference attribute throughout this document.

Each of the URI descriptions 201,203,205 can include corresponding metadata 207,209,211 that describes one or more operations (e.g., add, delete, get, etc.) that can be called on the RESTful web service, one or more input parameters that can be passed for the operations, return values from an operation, etc. One implementation for creating server-side metadata for the URIs is described in greater detail below in conjunction with FIG. 5. The metadata 207,209,211 can describe whether an argument is an optional argument or a mandatory argument. For example, metadata 207 may have a description 213 indicating that a header argument is mandatory and may have another description 215 indicating that another header argument is optional.

Figure 3:
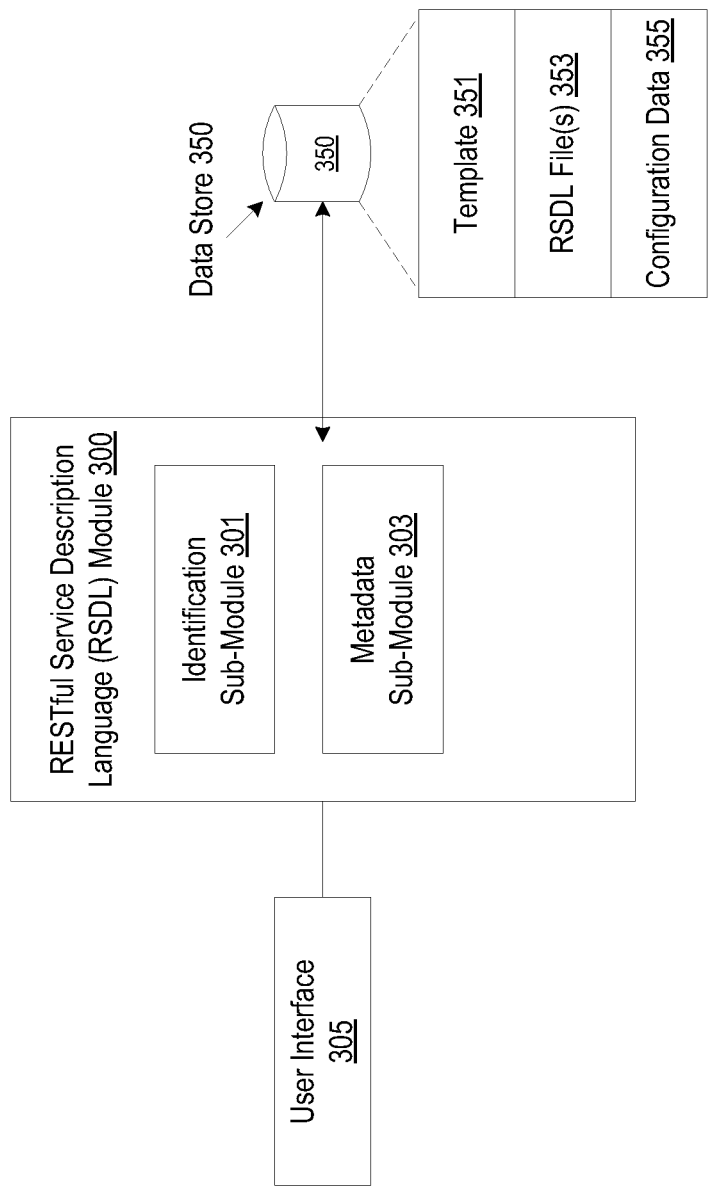
FIG. 3 is a block diagram of an implementation of a RESTful service description language (RSDL) module.

FIG. 3 illustrates a block diagram of one implementation of a RESTful service description language (RSDL) module 300. The RSDL module 300 may correspond to a RSDL module 137 in a machine 102 of FIG. 1. The RSDL module 300 can include an identification sub-module 301 and a metadata sub-module 303. Note that in alternative implementations, the functionality of one or more of the sub-modules can be combined or divided.

The identification sub-module 301 can locate a RESTful web service in a server and can identify the URIs for the RESTful web service. The identification sub-module 301 can locate the source code for the RESTful web service in a server and identify the URIs from the source code. In one implementation, the RSDL module 300 and the source code reside on different servers. In another implementation, the RSDL module 300 and the source code reside on the same server. The identification sub-module 301 can receive user input, via a user interface 305 that is coupled to the RSDL module 300, that identifies the RESTful web service and can search for the source code for the RESTful web service, for example, in a source code repository. The user interface 305 can be, for example, and not limited to, a graphical user interface (GUI), command-line interface, etc.

The identification sub-module 301 can use configuration data 355 that is stored in a data store 350 that is coupled to the RSDL module 300 to search for the source code for the RESTful web service. For example, the configuration data 355 may specify a directory path that stores the source code and the identification sub-module 301 can search the directory path using the user input of the RESTful web service to locate the source code for the RESTful web service.

After locating the source code for the RESTful web service, the identification sub-module 301 can search the source code to identify the URIs for the RESTful web service. For example, the identification sub-module 301 can search the source code for the root resource class of the RESTful web service and then use the root resource class to search for methods, actions, and/or sub-resources for the root resource class. The root resource class is the entry point into a RESTful web service. The configuration data 355 can specify the search parameters that can be used for various programming languages. For example, for a RESTful web service that has Java-based source code, the identification sub-module 301 may search the source code for a root resource class using the search parameter '@PATH' annotation. The identification sub-module 301 can identify the URIs by searching the source code for identifiers, for example, as specified in the configuration data 355. For example, for Java-based source code, the identification sub-module 301 can search for annotations (e.g., @PATH, @GET, @POST, @PUT, @DELETE, @HEAD, etc.) in the source code to identify the URIs.

After the URIs are identified in the source code, the metadata sub-module 303 can create server-side metadata to describe the URIs of the RESTful web service. The metadata sub-module 303 can use the source code for the URIs of the RESTful web service to create the server-side metadata. The server-side metadata can describe the identified URIs using HTTP attributes (e.g., HTTP rel, HTTP href) and a template 351 that is stored in a data store 350 that is coupled to the metadata sub-module 303. One implementation for using HTTP attributes to describe the URI is described in greater detail below in conjunction with FIG. 5. The template 351 can format the server-side metadata as a list of URIs. The URIs in the list can each be described using the HTTP attributes and can include descriptions for the request arguments (e.g., method arguments, header arguments, body arguments, and URI arguments) and the response arguments for the URI. The server-side metadata can search the source code for request arguments (e.g., method arguments, header arguments, body arguments, and URI arguments) and response arguments for the URI and can create the server-side metadata for the request arguments and response arguments. One implementation for creating server-side metadata for request arguments and response arguments is described in greater detail below in conjunction with FIG. 5. The template 351 can format the server-side metadata in XML. The template 351 can format the server-side metadata such that the metadata for one URI is not nested in metadata for another URI.

Examples of server-side metadata can include, and are not limited to, the HTTP relationship attribute of the URI, the HTTP hypertext reference attribute of the URI, the HTTP method to use to perform an operation (e.g., add, delete, get, etc.) for the URI, the header for the URI, the header parameters to pass for the URI, the body type for the URI, the body parameters to pass for the URI, the return type for the URI, etc.

The metadata sub-module 303 can store the server-side metadata for each URI in the data store 350. The metadata sub-module 303 can collect the server-side metadata for all of the URIs for the RESTful web service and can format the server-side metadata for the URIs in a Restful Service Description Language (RSDL) file using the template 351. The metadata sub-module 303 can store the RSDL file 353 for the URIs for the RESTful web service in the data store 350. The data store 350 can store RSDL files 353 for any number of RESTful web services.

The data store 350 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 4:
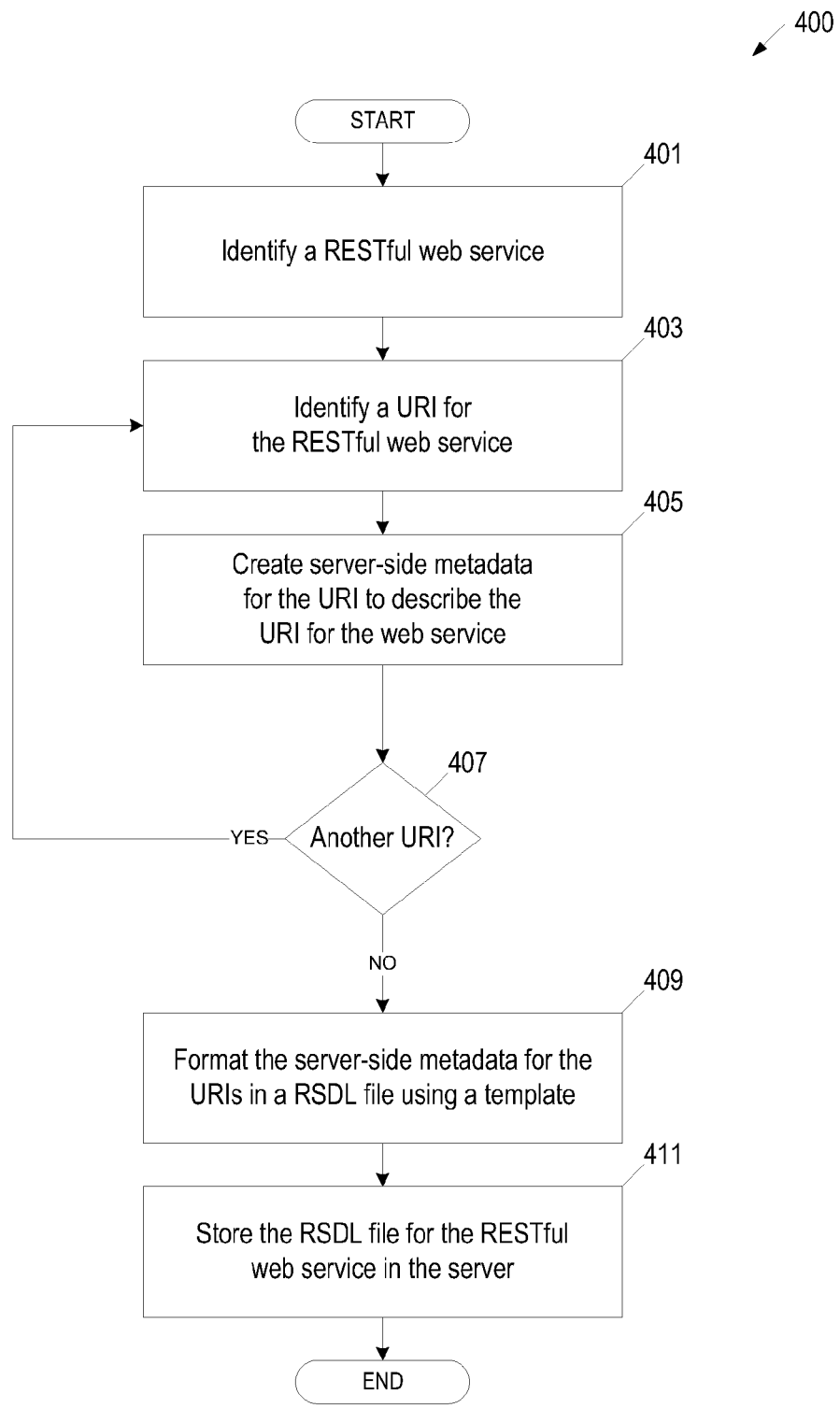
FIG. 4 is a flow diagram illustrating an implementation for a method for describing URIs of a RESTful web service.

FIG. 4 is a flow diagram of an implementation of a method 400 for describing URIs of a RESTful web service in a generic way. Method 400 can be performed by processing logic that can comprise hardware (e.g., circuitry, dedicated logic, programmable logic, microcode, etc.), software (e.g., instructions run on a processing device), or a combination thereof. In one implementation, method 400 is performed by a RSDL module 137 in a server machine 130 of FIG. 1.

At block 401, processing logic identifies a RESTful web service in a server. The server can be a HTTP-based server. Processing logic can receive user input identifying the RESTful web service. At block 403, processing logic identifies a URI for the RESTful web service. Processing logic can search a source code repository in a server for source code for the RESTful web service and can search the source code for a URI for the RESTful web service. For example, processing logic can search for an annotation in the source code.

At block 405, processing logic creates server-side metadata to describe the identified URI. Examples of server-side metadata can include, and are not limited to, the HTTP relationship attribute of the URI, the HTTP hypertext reference attribute of the URI, the HTTP method to use to perform an operation (e.g., add, delete, get, etc.) for the URI, the header for the URI, the header parameters to pass for the URI, the body type for the URI, the body parameters to pass for the URI, the return type for the URI, etc. One implementation for creating server-side metadata to describe the URI is described in greater detail below in conjunction with FIG. 5. At block 407, processing logic determines whether there is another URI for the RESTful web service in the server. If there is another URI, processing logic returns to block 403 to identify the URI.

If there is not another URI for the RESTful web service, processing logic formats the server-side metadata for the URIs in a RSDL file using a template at block 409. The RSDL file can be formatted to include a listing of the URIs as described using the HTTP attributes (e.g., HTTP rel, HTTP href) and the descriptions for the request arguments (e.g., header arguments, body arguments, URI arguments) and the response arguments (e.g., return type) for each URI. The RSDL file can describe the URIs such that no metadata for one URI is nested in metadata for another URI. At block 411, processing logic stores the RSDL file for the RESTful web service in the server.

Figure 5:
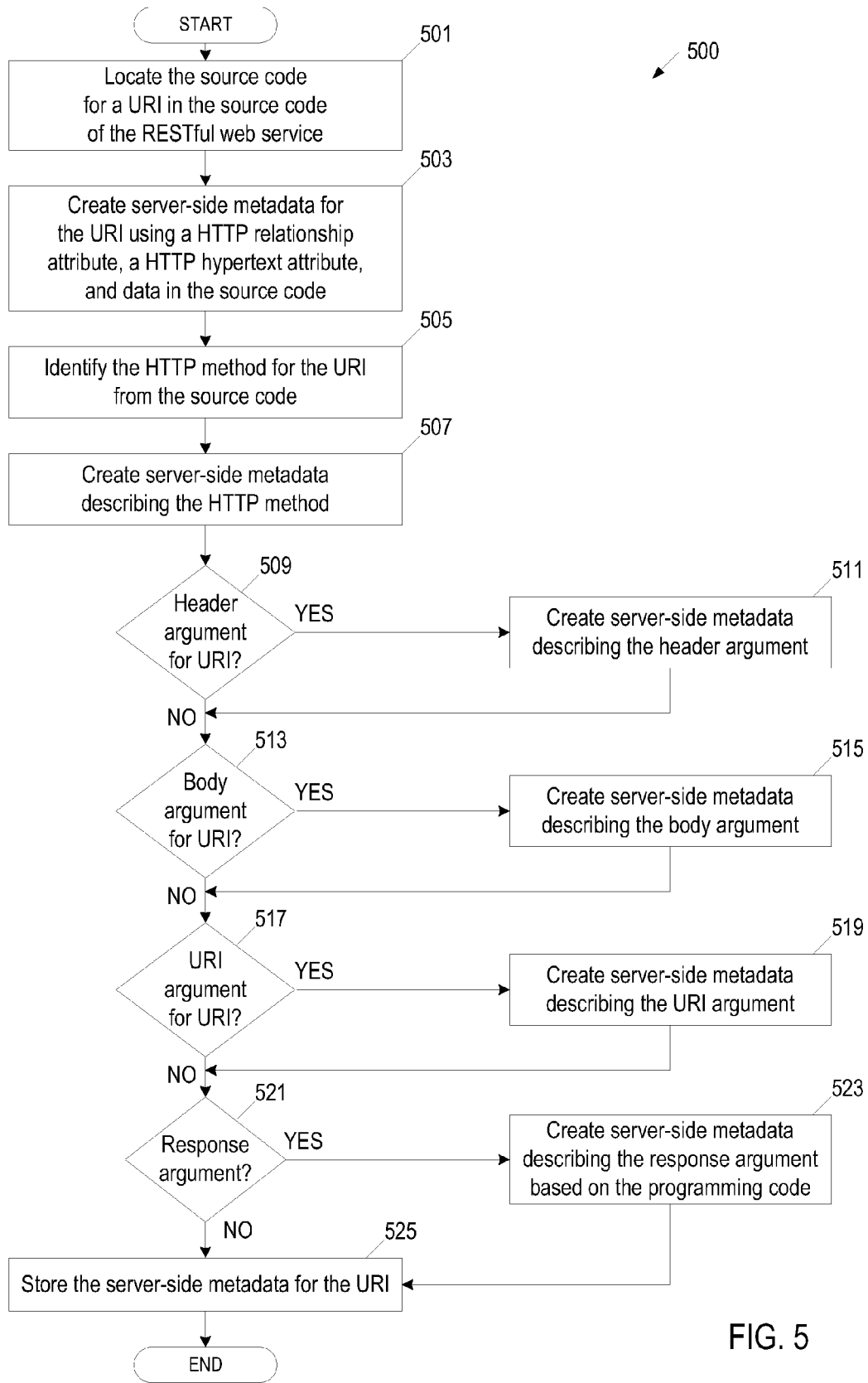
FIG. 5 is a flow diagram illustrating an implementation for a method for creating server-side metadata describing a URI of a RESTful web service.

FIG. 5 is a flow diagram of an implementation of a method 500 for creating server-side metadata describing a URI of a RESTful web service. Method 500 can be performed by processing logic that can comprise hardware (e.g., circuitry, dedicated logic, programmable logic, microcode, etc.), software (e.g., instructions run on a processing device), or a combination thereof. In one implementation, method 500 is performed by a RSDL module 137 in a machine 103 of FIG. 1.

At block 501, processing logic locates the source code for a URI in the source code for the RESTful web service. Processing logic can use configuration data to search the source code for the RESTful web service for the portion of the source code that corresponds to a URI. For example, the configuration data may specify one or more search parameters that can be used to search the server. The configuration data can specify search parameters for various programming languages. For example, processing logic may search for an annotation (e.g, @PATH, @GET, @POST, @DELETE) for a RESTful web service that has Java-based source code. The configuration data can be stored in a data store that is coupled to the RSDL module. At block 503, processing logic creates server-side metadata describing the URI using the data in the source code, a HTTP relationship attribute (e.g., HTTP rel), and a HTTP hypertext attribute (e.g., HTTP href). Processing logic can use a template to create the server-side metadata describing the URI.

Processing logic can process the request arguments (e.g., method arguments header arguments, body arguments, and URI arguments) in the source code for the URI. At block 505, processing logic identifies the HTTP method for the URI from the URI source code and creates server-side metadata describing the HTTP method at block 507. Processing logic can use a template to create the server-side metadata describing the HTTP method for the URI. The HTTP method for the URI is the operation (e.g., add) that can be called on the RESTful web service for the resource using the HTTP method. One implementation of server-side metadata describing the HTTP method for the URI is described in greater detail below in conjunction with FIG. 6.

At block 509, processing logic determines whether there is a header argument for the URI in the URI source code. A header argument can be one or more parameters that can be extracted from the HTTP headers and can be used for the resource. The header argument can be used to specify the behavior of the server. For example, the header argument may specify when the server can return control to a client. Processing logic can search for an identifier, for example, as specified by configuration data. For example, the configuration data may specify that an annotation (e.g., javax.ws.rs.HeaderParam) may be used to determine whether there is a header argument for the URI in the source code. If there is a header argument, processing logic creates server-side metadata describing the header argument at block 511. Processing logic can use a template to create the server-side metadata describing the header argument for the URI. One implementation of server-side metadata describing the header argument for the URI is described in greater detail below in conjunction with FIG. 6.

If there is not a header argument (block 509), processing logic determines whether there is a body argument for the URI in the URI source code at block 513. A body argument can be one or more parameters that can be extracted from the request representation and can be used for the resource. For example, the body argument can be used for extracting information sent by a HTTP POST method. Processing logic can search for an identifier, for example, as specified by configuration data. For example, the configuration data may specify that an annotation (e.g., javax.ws.rs.FormParam) may be used to determine whether there is a body argument for the URI. If there is a body argument, processing logic creates server-side metadata describing the body argument at block 511. Processing logic can use a template to create the server-side metadata describing the body argument of the URI. One implementation of server-side metadata describing the body method for the URI is described in greater detail below in conjunction with FIG. 6.

If there is not a body argument (block 513), processing logic determines whether there is a URI argument for the URI in the URI source code at block 517. A URI argument can be one or more parameters that can be extracted from the URI and can be used for the resource. Processing logic can search for an identifier, for example, as specified by configuration data. For example, the configuration data may specify that an annotation (e.g., @PathParam, @QueryParam, @MatrixParam) may be used to determine whether there is a URI argument for the URI. If there is a URI argument, processing logic creates server-side metadata pertaining to the URI argument at block 519. Processing logic can use a template to create the server-side metadata describing the URI argument for the URI. One implementation of server-side metadata describing the URI argument for the URI is described in greater detail below in conjunction with FIG. 6.

If there is not a URI argument (block 517), processing logic determines whether there is a response argument for the URI in the URI source code at block 521. A response argument can describe the return type that a consumer (e.g., client application) can receive when the URI is invoked. Processing logic can determine whether there is a response argument for the URI from the method signature. For example, processing logic can determine the return type from the method signature. If there is a response argument, processing logic creates server-side metadata describing the response argument at block 523. Processing logic can use a template to create the server-side metadata describing the response argument for the URI. Implementations of server-side metadata describing a response argument for the URI are described in greater detail below in conjunction with FIG. 6 and FIG. 7. If there is not a response argument (block 521), processing logic stores the server-side metadata for the URI at block 525.

Figure 6:
FIG. 6 illustrates an example of server-side metadata describing a URI of a RESTful web service, in accordance with various implementations.

FIG. 6 illustrates an example of server-side metadata 600 describing a URI of a RESTful web service, in accordance with various implementations. For example, the RESTful web service may be a virtual infrastructure management web service. The RESTful web service may include a resource for adding a datacenter to the infrastructure. The resource can have a corresponding URI.

The source code for the URI can be used to create the server-side metadata 600. The server-side metadata 600 can include a URI description 601 for the URI. The URI description 601 can use a HTTP relationship attribute (e.g., HTTP rel) and a HTTP hypertext attribute (e.g., HTTP href) to describe the URI. The URI description 601 can include metadata that describes request 603 arguments (e.g., method arguments, header arguments, body arguments, URI arguments) and response 605 arguments (e.g., return type). For example, the server-side metadata 600 may include method metadata 607 describing an HTTP method, such as a HTTP POST method, that is being used for the URI.

The server-side metadata 600 may also include metadata 609 for a header argument for the URI and metadata 611 for a body argument for the URI. The body argument for the URI can include input parameters that can be passed for the operation (e.g., POST operation). For example, the metadata 611 for the body argument may include metadata 613 for a parameter (e.g., datacenter name) to be passed for the POST method. The server-side metadata 600 may also include metadata 615 for a response 605 argument for the URI. For example, the response argument for the URI may return a 'DataCenter' type from the operation.

Figure 7:
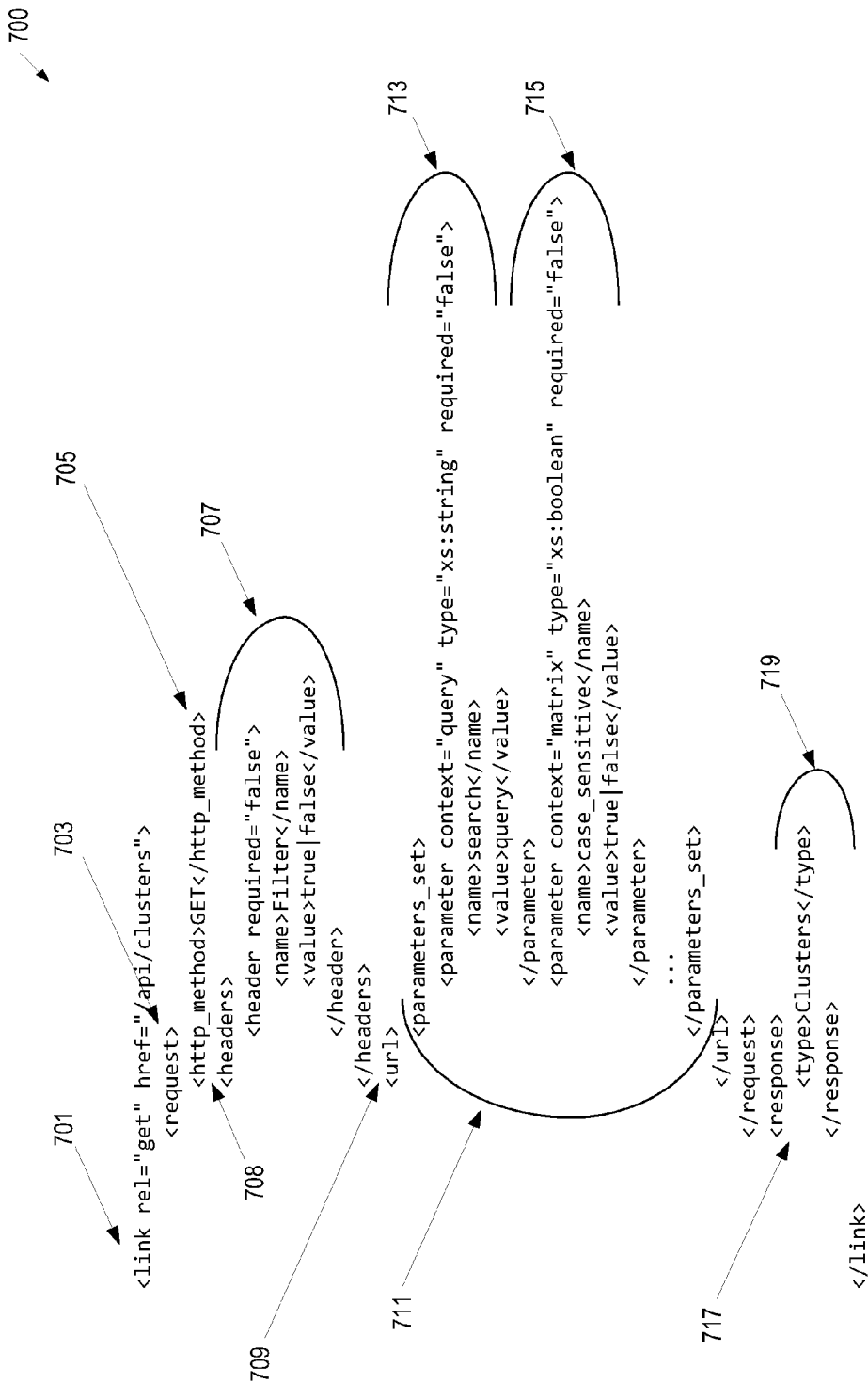
FIG. 7 illustrates an example of server-side metadata describing a URI of a RESTful web service, in accordance with various implementations.

FIG. 7 illustrates an example of server-side metadata 700 describing a URI of a RESTful web service, in accordance with various implementations. The source code for the URI can be used to create the server-side metadata 700. The server-side metadata 700 can include a URI description 701 for the URI. The URI description 701 can use a HTTP relationship attribute (e.g., HTTP rel) and a HTTP hypertext attribute (e.g., HTTP href) to describe the URI. The URI description 701 can include metadata that describes request 703 arguments (e.g., method arguments, header arguments, body arguments, URI arguments) and response 717 arguments (e.g., return type). For example, the server-side metadata 700 may include method metadata 705 describing an HTTP method, such as a HTTP GET method, that is being used for the URI. The server-side metadata 700 may also include metadata 707 for a header argument (e.g., header argument 708) for the URI. The server-side metadata 700 may also include metadata 711 for a URI argument (e.g., URI argument 709) for the URI. The URI argument for the URI can include one or more input parameters that can be passed for the operation (e.g., GET operation). For example, the metadata 711 for the URI argument may include metadata 713 for a parameter (e.g., search query name) for a query parameter to be passed for the GET method and metadata 715 for another parameter (e.g., matrix parameter) to be passed for the GET method. The server-side metadata 700 may also include metadata 719 for a response 717 argument for the URI. For example, the response argument for the URI may return a 'Cluster' type from the operation.

Figure 8:
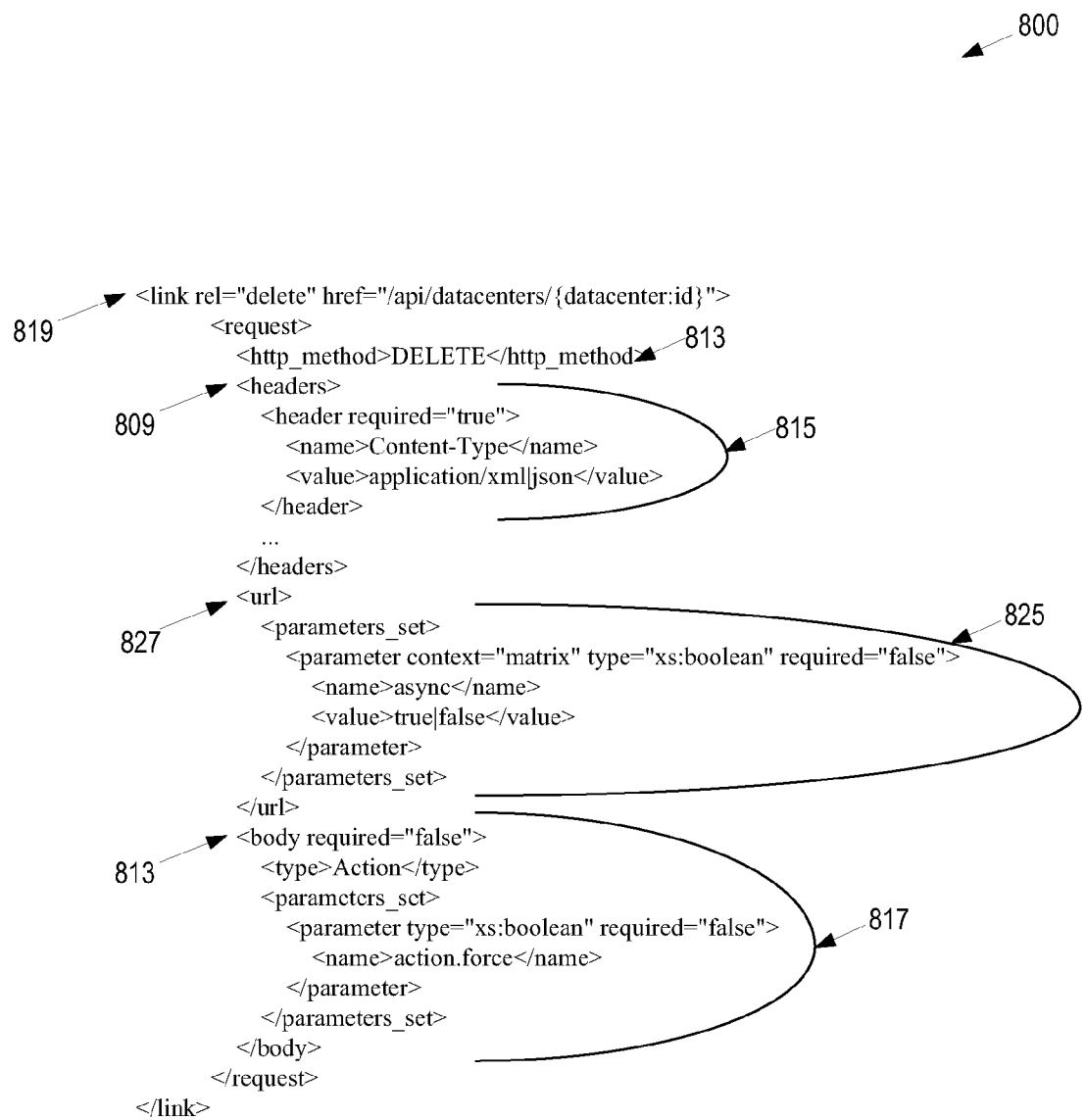
FIG. 8 illustrates an example of server-side metadata describing URIs for a method overload for a RESTful web service, in accordance with various implementations.

FIG. 8 illustrates an example of server-side metadata 800 describing URIs for a method overload for a RESTful web service, in accordance with various implementations. Server-side metadata 800 describes various implementations for describing different parameters to be passed for URI descriptions having the link. A procedural programming language (e.g., Java, C++, C#, D, Ada) can include a method overload. A method overload is several methods having the same name and each method accepts a different set of parameters. Several methods with the same name may differ from each other in the type of input and the output of the function. RSDL can support method overloads. For example, the URI descriptions may be the same and the parameters for each URI description may be different. For example, there may be one URI that has the HTTP relationship attribute value of "delete" and the HTTP hypertext reference value of "/api/datacenters/{datacenter:id}," and there may be different sets of metadata for the URI. For example, one set of metadata for the URI may not pass parameters for the URI, whereas another set of metadata for the URI may pass one or more parameters for the URI.

In one implementation, the metadata describes method overloads by passing parameters for the corresponding URI via an optional body argument. In another implementation, the metadata describes method overloads by passing parameters via a parameter set. For example, the URI description 819 includes metadata 813 for the method for the URI, metadata 815 for a header 809 argument for the URI, and metadata 817 for a body 813 argument for the URI. The metadata 817 for the body 813 argument for the URI description 809 may include a parameter set that describes the one or parameters to be passed for the URI description 819. In another example, the metadata for the URI 827 argument for the URI description 819 may include a parameter set 825 that describes one or more parameters to be passed for the URI description 819.

Figure 9:
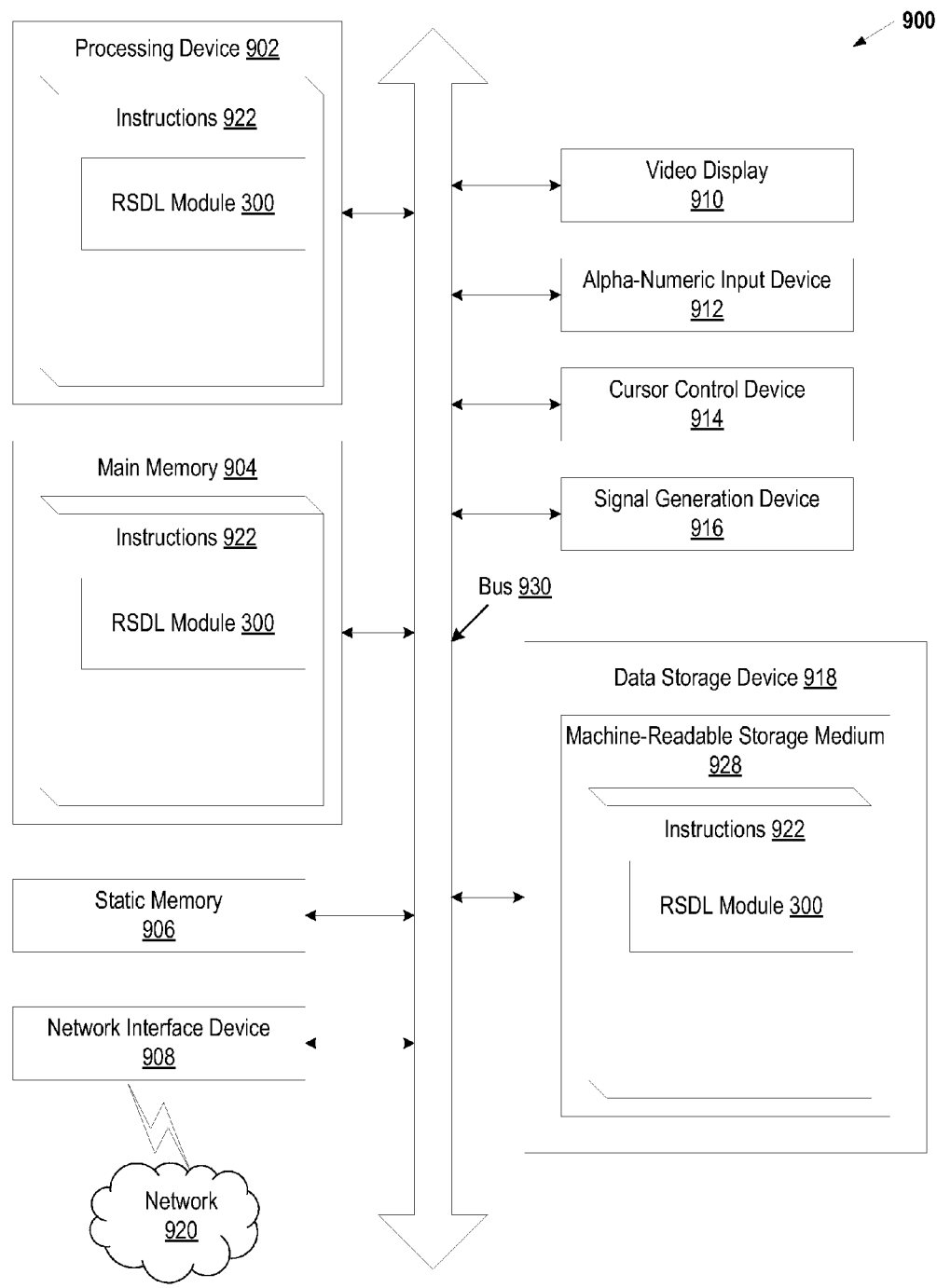
FIG. 9 is a block diagram of an example computer system that may perform one or more of the operations described herein.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute instructions 922 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a machine-readable storage medium 928 (also known as a computer-readable medium) on which is stored one or more sets of instructions or software 922 embodying any one or more of the methodologies or functions described herein. The instructions 922 may also reside, completely or at least partially, within the main memory 904 and/or within the processing device 902 during execution thereof by the computer system 900, the main memory 904 and the processing device 902 also constituting machine-readable storage media.

In one implementation, the instructions 922 include instructions for a RSDL module (e.g., RSDL module 300 of FIG. 3) and/or a software library containing methods that call modules in a RSDL module. While the machine-readable storage medium 928 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "creating" or "formatting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
identifying a first uniform resource identifier (URI) and a second URI for a Representational State Transfer (RESTful) web service in a server, wherein the second URI is nested in metadata of the first URI;
creating, by a processing device, a first set of server-side RESTful service description language (RSDL) metadata describing the first URI;
creating, by the processing device, a second set of server-side RSDL metadata describing the second URI;
creating an RSDL file comprising the first URI, the first set of server-side RSDL metadata, the second URI, and the second set of server-side RSDL metadata; and
formatting content in the RSDL file as a un-nested list of URIs comprising a first entry that includes the first URI and the first set of server-side RSDL metadata and a second entry that includes the second URI and the second set of server-side RSDL metadata.

2. The method of claim 1, wherein the RSDL file comprises server-side metadata describing a method overload corresponding to a subset of a plurality of URIs for the RESTful web service.

3. The method of claim 1, wherein the server-side RSDL metadata for the first URI comprises a description of a header argument of the URI.

4. The method of claim 1, wherein the server-side RSDL metadata for the first URI comprises a description of a body argument of the URI.

5. The method of claim 1, wherein:
information describing a structure of the first URI and the second URI describes a data structure of the first URI and the second URI; and
information describing an operation associated with the first URI or the second URI describes at least one of a type of the operation, an input parameter for the operation, or a return value from the operation.

6. The method of claim 1, wherein the creating the first set of server-side RSDL metadata further comprises creating server-side RSDL metadata each URI of a plurality of URIs.

7. The method of claim 6, wherein creating the server-side RSDL metadata for the first URI, further comprises:
locating source code for the first URI in source code of the RESTful web service;
creating server-side metadata for the URI using a HTTP relationship attribute, a HTTP hypertext attribute, and data in the source code;
identifying a HTTP method for the URI from the source code;
creating server-side metadata describing the HTTP method for the URI;
creating server-side metadata describing a header argument for the URI;
creating server-side metadata describing a body argument for the URI;
creating server-side metadata describing a URI argument for the URI;
creating server-side metadata describing a response argument in view of programming code; and
storing the server-side RSDL metadata for the URI in the server.

8. A non-transitory computer-readable storage medium comprising executable instructions that, when executed by a processing device, cause the processing device to:
identify, by the processing device, a first uniform resource identifier (URI) and a second URI for a Representational State Transfer (RESTful) web service in a server, wherein the second URI is nested in metadata of the first URI;
create, by the processing device, a first set of server-side RESTful service description language (RSDL) metadata describing the first URI;
create, by the processing device, a second set of server-side RSDL metadata describing the second URI;
create an RSDL file comprising the first URI, the first set of server-side RSDL metadata, the second URI, and the second set of server-side RSDL metadata; and
format content in the RSDL file as a un-nested list of URIs comprising a first entry that includes the first URI and the first set of server-side RSDL metadata and a second entry that includes the second URI and the second set of server-side RSDL metadata.

9. The non-transitory computer-readable storage medium of claim 8, wherein the file comprises server-side RSDL metadata describing a method overload corresponding to a subset of a plurality of URIs for the RESTful web service.

10. The non-transitory computer-readable storage medium of claim 8, wherein the first set of server-side RSDL metadata for the first URI comprises a description of a header argument of the URI.

11. The non-transitory computer-readable storage medium of claim 8, wherein the first set of server-side RSDL metadata for the first URI comprises a description of a body argument of the URI.

12. The non-transitory computer-readable storage medium of claim 8, wherein to create the server-side RSDL metadata the processing device is further to create server-side RSDL metadata for the first URI.

13. The non-transitory computer-readable storage medium of claim 12, wherein to create the server-side RSDL metadata for the first URI the processing device is further to:
locate source code for first URI in source code of the RESTful web service;
create server-side metadata for the URI using a HTTP relationship attribute, a HTTP hypertext attribute, and data in the source code;
identify a HTTP method for the URI from the source code;
create server-side metadata describing the HTTP method for the URI;
create server-side metadata describing a header argument for the URI;
create server-side metadata describing a body argument for the URI;
create server-side metadata describing a URI argument for the URI;

create server-side metadata describing a response argument in view of programming code; and
store the server-side RSDL metadata for the URI in the server.

14. A system comprising:
a memory; and
a processing device, operatively coupled to the memory, to:
identify a first uniform resource identifier (URI) and a second URI for a Representational State Transfer (RESTful) web service in a server, wherein the second URI is nested in metadata of the first URI;
create a first set of server-side RESTful service description language (RSDL) metadata describing the first URI;
creating, by the processing device, a second set of server-side RSDL metadata describing the second URI;
create an RSDL file comprising the first URI, the first set of server-side RSDL metadata, the second URI, and the second set of server-side RSDL metadata; and
formatting content in the RSDL file RSDL file as a un-nested list of URIs comprising a first entry that includes the first URI and the first set of server-side RSDL metadata and a second entry that includes the second URI and the second set of server-side RSDL metadata.

15. The system of claim 14, wherein the file comprises server-side RSDL metadata describing a method overload corresponding to a subset of a plurality of URIs for the RESTful web service.

16. The system of claim 14, wherein the server-side RSDL metadata for the first URI comprises a description of a header argument of the URI.

17. The system of claim 14, wherein the server-side RSDL metadata for the first URI comprises a description of a body argument of the URI.

18. The system of claim 14, wherein to create the server-side RSDL metadata, the processing device is further to create server-side RSDL metadata each URI of a plurality of URIs.

19. The system of claim 18, wherein to create server-side RSDL metadata for the first URI, the processing device is further to:
locate source code for the first URI in source code of the RESTful web service;
create server-side metadata for the URI using a HTTP relationship attribute, a HTTP hypertext attribute, and data in the source code;
identify a HTTP method for the URI from the source code;
create server-side metadata describing the HTTP method for the URI;
create server-side metadata describing a header argument for the URI;
create server-side metadata describing a body argument for the URI;
create server-side metadata describing a URI argument for the URI;
create server-side metadata describing a response argument in view of programming code; and
store the server-side RSDL metadata for the URI in the server.

* * * * *